(12) United States Patent
Suzuki (10) Patent No.: US 10,369,770 B2
(45) Date of Patent: Aug. 6, 2019

(54) MOLDED ARTICLE COVERED WITH FILM

(71) Applicant: RIKEN TECHNOS CORPORATION, Tokyo (JP)

(72) Inventor: Yasuhiro Suzuki, Tokyo (JP)

(73) Assignee: RIKEN TECHNOS CORPORATION, Tokyo (JP)

( * ) Notice: Subject to any disclaimer, the term of this patent is extended or adjusted under 35 U.S.C. 154(b) by 149 days.

(21) Appl. No.: 14/848,735

(22) Filed: Sep. 9, 2015

(65) Prior Publication Data

US 2015/0375443 A1 Dec. 31, 2015

Related U.S. Application Data

(62) Division of application No. 14/131,516, filed as application No. PCT/JP2011/065911 on Jul. 12, 2011, now abandoned.

(51) Int. Cl.
*B32B 37/00* (2006.01)
*B32B 37/10* (2006.01)
(Continued)

(52) U.S. Cl.
CPC .......... *B32B 37/0023* (2013.01); *B29C 51/10* (2013.01); *B29C 51/16* (2013.01); *B29C 53/00* (2013.01); *B29C 66/022* (2013.01); *B32B 7/12* (2013.01); *B32B 37/0007* (2013.01); *B32B 37/10* (2013.01); *B29C 51/04* (2013.01); *B29C 51/14* (2013.01); *B29C 51/421* (2013.01); *B29C 2791/006* (2013.01); *B29K 2105/0097* (2013.01);
(Continued)

(58) Field of Classification Search
CPC ... B29C 2791/006; B29C 51/10; B32B 37/10; B32B 37/1018; B32B 37/0007; B32B 37/0023
See application file for complete search history.

(56) References Cited

U.S. PATENT DOCUMENTS 3,551,232 A 12/1970 Thompson ..................... 156/87
4,182,382 A 1/1980 Ingraham ..................... 140/3 R
(Continued)

FOREIGN PATENT DOCUMENTS

JP 54132675 10/1979
JP 02231125 B2 9/1990
(Continued)

OTHER PUBLICATIONS

Machine Translation of JP2011016258A (Year: 2011).*
AIPN Machine Translation of JP 10-242635 A.

*Primary Examiner* — Christopher T Schatz
(74) *Attorney, Agent, or Firm* — Robert W. Morris; Eckert Seamans Cherin & Mellot, LLC (57) ABSTRACT

PURPOSE: The present invention provides a molded article which comprises a substrate whose surface is covered with a film, has good appearance, and does not deteriorate in the appearance even in severe environment where the article is actually used, such as high-temperature environment.
CONSTITUTION: A molded article comprising a substrate whose surface is partially or wholly covered with a film, wherein the film has an adhesive layer, the adhesive layer is in contact with the substrate and the surface of the substrate, which surface is in contact with the adhesive layer, has a surface roughness (A) of 3 to 20 μm.

7 Claims, 3 Drawing Sheets

(51) Int. Cl.
  *B29C 65/00* (2006.01)
  *B29C 51/16* (2006.01)
  *B29C 51/10* (2006.01)
  *B29C 53/00* (2006.01)
  *B32B 7/12* (2006.01)
  *B29C 51/42* (2006.01)
  *B29C 51/14* (2006.01)
  *B29K 105/00* (2006.01)
  *B29C 51/04* (2006.01)
  *B29L 31/00* (2006.01)
  *B29L 9/00* (2006.01)

(52) U.S. Cl.
  CPC ..... *B29L 2009/00* (2013.01); *B29L 2031/722* (2013.01); *Y10T 156/1002* (2015.01); *Y10T 428/24355* (2015.01)

(56) References Cited

U.S. PATENT DOCUMENTS

| | | | | |
|---|---|---|---|---|
| 4,225,379 | A | * | 9/1980 | Ishii ............ B29C 63/02 156/153 |
| 6,333,383 | B1 | | 12/2001 | Ohnishi ............ 525/92 F |
| 2003/0125465 | A1 | | 7/2003 | Koyama et al. ............ 525/191 |
| 2003/0226637 | A1 | * | 12/2003 | David ............ B44C 1/10 156/212 |
| 2012/0187672 | A1 | | 7/2012 | Sakagami et al. |

FOREIGN PATENT DOCUMENTS

| | | | | |
|---|---|---|---|---|
| JP | 03260689 | | 11/1991 | |
| JP | 3016518 | B2 | 10/1992 | |
| JP | 10119131 | B2 | 5/1998 | |
| JP | 10242635 | | 9/1998 | |
| JP | 10242635 | A | 9/1998 | ............ H05K 3/44 |
| JP | 2000157346 | A4 | 6/2000 | |
| JP | 2001334575 | B2 | 12/2001 | |
| JP | 3733564 | B2 | 3/2002 | |
| JP | 2003094541 | B3 | 4/2003 | |
| JP | 2004237510 | B2 | 8/2004 | |
| JP | 2005059573 | B3 | 3/2005 | |
| JP | 2005205877 | B3 | 8/2005 | |
| JP | 2007230592 | | 9/2007 | |
| JP | 2011016258 | A | * | 1/2011 |

\* cited by examiner

Fig. 2

MOLDED ARTICLE COVERED WITH FILM

CROSS-REFERENCE TO RELATED APPLICATIONS

This application is a divisional of, commonly owned U.S. patent application Ser. No. 14/131,516, filed Jan. 8, 2014, which is a U.S. National Phase filing of commonly owned International Patent Application No. PCT/JP2011/065911, filed Jul. 12, 2011, both of which are incorporated herein by reference.

FIELD OF THE INVENTION

The present invention relates to a molded article whose surface is covered with a film such as a decorative film. Particularly, the present invention relates to a molded article such as automobile interior and exterior parts, housings of household electrical appliances including refrigerators and housings of information-processing electronic equipments including personal computers and smartphones, whose surface is covered with a decorative film.

BACKGROUND OF THE INVENTION

Conventionally, automobile parts such as instrument panels were directly coated with paint of a curable resin such as a melamine resin, an isocyanate resin and a urethane resin, chosen depending on a material of the parts, in order to provide the parts with scratch resistance, weather resistance, durability, stain resistance, corrosion resistance and design.

Housings of household electrical appliances were directly coated with hard coat paint of an ultraviolet curable acrylic resin, in order to provide the housings with scratch resistance, durability, stain resistance and design.

However, such direct coating is associated with such problems that many steps, such as masking of areas not to be coated, coating, hardening and finishing, are necessary; preservation of a work environment and management for safety and health are necessary in handling a solvent type paint; skill is necessary for forming a uniform and defect-free coating; and spray coating limits diversity of design. Further, the ultraviolet curable hard coat paint is easily deteriorated by ultraviolet and, therefore, does not have sufficient weather resistance.

Therefore, it was proposed to apply a decorative film having an adhesive layer on one side to a surface of a molded article, such as automobile parts, by vacuum forming, instead of the direct coating (see the following Patent Literatures 1 to 3). Application of a decorative film solves the problems on workability, environment safety and design which occur in the direct coating. However, it is associated with such problems that air remains between a surface of a molded article, to which surface a decorative film is applied, and the decorative film to cause blisters on the surface of the molded article covered with the film (hereinafter, referred to as a covered molded article) so as to deteriorate the appearance of the covered molded article. Even if the blisters are so small as invisible immediately after the application, the residual air expands highly upon exposure to high-temperature environment to remarkably deteriorate the appearance. This is very troublesome.

In order to solve this problem, it is proposed to provide an adhesive layer of a decorative film with communicating grooves or passages for deaeration (see Patent Literatures 4 and 5).

However, after the molded article is covered with such a decorative film with the grooves on the adhesive layer, the film sinks in the grooves to form a concave-convex pattern on the surface of the covered molded article. Further, air is still present in the grooves after the covering. As a result, when the surface of the film is touched with a hand, the air moves to form a concave-convex pattern on the surface of the covered molded article; or when the covered molded article is exposed to high-temperature environment, the air expands to cause blisters on the surface of the covered molded article and remarkably deteriorates the appearance.

PRIOR ART LITERATURES

Patent Literatures

Patent Literature 1: Japanese Patent Publication No. Sho 56-45768/1981
Patent Literature 2: Japanese Patent No. 3016518
Patent Literature 3: Japanese Patent No. 3733564
Patent Literature 4: Japanese Patent Application Laid-Open No. 2004-237510
Patent Literature 5: Japanese Patent Application Laid-Open No. 2000-157346

SUMMARY OF THE INVENTION

Purpose of the Invention

An object of the present invention is to provide a molded article which comprises a substrate whose surface is covered with a film, which article has good appearance and does not deteriorate in the appearance even in severe environment where the article is actually used, such as high-temperature environment.

Means for Achieving the Purpose

On account of earnest investigations, the present inventor has found that the aforesaid problems are solved by controlling a surface roughness of the substrate whose surface is to be covered with a film, and reached the present invention.

Thus, the present invention is a molded article comprising a substrate whose surface is partially or wholly covered with a film, wherein the film has an adhesive layer, the adhesive layer is in contact with the substrate, and the surface of the substrate, which surface is in contact with the adhesive layer, has a surface roughness (A) of 3 to 20 μm. The present invention also provides a process for producing the aforesaid molded article.

Effects of the Invention

The present molded article covered with a film does not allow air to remain between the film and the substrate. Therefore, the molded article has excellent appearance, does not deteriorate in the appearance even in severe environment where the article is actually used, such as high-temperature environment, and has excellent durability.

EMBODIMENTS OF THE INVENTION

The present molded article comprises a substrate whose surface is partially or wholly covered with a film. The film comprises a base layer and an adhesive layer, and the adhesive layer is in contact with the substrate, so that the substrate is covered with the film.

The present molded article requires that a surface of the substrate, which surface is in contact with the adhesive layer of the film, has a surface roughness (A) of 3 to 20 μm, preferably 6 to 15 μm. This range of the surface roughness (A) of the substrate attains enough deaeration between the surface of the substrate and the film and, therefore, no air remains there, when the film is applied to the surface of the substrate. Therefore, the resulting molded article has good appearance and does not deteriorate in the appearance even exposed to high-temperature environment. If the surface roughness (A) is less than 3 μm, deaeration is not enough. If the surface roughness (A) exceeds 20 μm, a profile of the surface of the substrate reflects a concave-convex pattern on the surface of the film after the application of the film to deteriorate the appearance. Further, adhesion between the film and the substrate is worse. Further, air tends to remain between the film and the substrate to cause blisters in high-temperature environment. A surface which is not covered with the film may have any profile. It may be flat or of a larger surface roughness.

In the present specification, the surface roughness is a mean maximum height (Rtm) obtained by extracting any part with an evaluation length L from a roughness profile, dividing the length L into five equal lengths, measuring a maximum height from a bottom to a top in the profile in each of the five sections and averaging these five maximum heights.

A Material for the substrate may be those usually used for automobile parts or housings of household electrical appliances, but not particularly limited to such. A covering operation on the surface of, for instance, automobile part or housing of household electrical appliance with a decorative film is usually carried out by vacuum forming or vacuum and pressure forming. Therefore, the material for the substrate is generally durable in such forming methods. For example, use may be appropriately made of metal such as an aluminum alloy and a magnesium alloy or one or more resin materials selected from polystyrene resins, acrylic resins, acryl-styrene resins, acryl-butadiene-styrene resins, polycarbonate resins, polyester resins, polyamide resins, polypropylene resins and polyethylene resins.

In the case where the material is metal, the material may be drawn to obtain a substrate having a desired shape. In the case where the material is a resin, the material may be injection molded to obtain a substrate having a desired shape. The surfaces of the substrates thus obtained are flat and have a surface roughness of less than 3 μm.

The substrate having a desired shape is subjected to surface roughening so as to have the specified surface roughness (A). A method for the roughening is not particularly limited. Examples of a method for directly roughening the surface of the substrate include sandblasting, sanding, etching, embossing and matte coating. In a case of injection molding or die casting molding, a surface of a mold is roughened by, for instance, sandblasting, sanding or etching and the pattern on the surface of the mold is transferred to the surface of the substrate to obtain a roughened surface on the substrate.

The present molded article may be obtained by applying the film to the substrate so that the adhesive layer of the film is in contact with the surface of the substrate. The surface of the adhesive layer of the film preferably has a surface roughness (B) of 3 to 20 μm, more preferably 6 to 15 μm before the application. This range of the surface roughness (B) attains good deaeration when the film is applied to the substrate, while maintaining good adhesion and durability. If the surface roughness (B) is less than 3 μm, deaeration may not be enough sometimes. If the surface roughness (B) exceeds 20 μm, a profile of the surface of the adhesive layer may reflect a concave-convex pattern on the surface of the film after the application of the film to deteriorate the appearance. Further, adhesion between the film and the substrate tends to be worse. Further, air tends to remain between the film and the substrate to cause blisters in high-temperature environment.

The surface roughness of the adhesive layer may be obtained by roughening a releasing surface of a release film and then transferring the profile of the resulting surface to the adhesive layer. The roughened releasing surface of a release film may be obtained by roughening a surface of a base film for the release film by means of, for instance, sandblasting, sanding, etching, embossing or matte coating, and then applying a releasing agent to the surface, or by applying a releasing agent to a surface of a base film for the release film, drying and curing the releasing agent, and then roughening the surface by means of embossing. Alternatively, a surface of the adhesive layer may be directly embossed immediately before the substrate is covered with the film by, for instance, vacuum forming.

Any adhesive material may be used for the adhesive layer as long as it has enough tacky or adhesive strength to the substrate and the base layer of the film. For example, use may be made of conventional adhesives and pressure-sensitive adhesives such as those of acrylate, ethylene vinyl acetate, vinyl acetate, polyester, polyurethane, natural rubber, epoxy resin, polyisobutylene, chloroprene rubber, and styrene-butadiene-rubber types. The adhesive layer is necessarily soft to be able to transform so that no air remains between the film and the substrate when the film is applied to the substrate, and is necessarily so hard as not to flow. Specifically, the adhesive preferably has a glass transition temperature of −10 to 50 degrees C., and the pressure-sensitive adhesive preferably has a glass transition temperature of −70 to −10 degrees C. Further, both of the pressure-sensitive adhesive and the adhesive preferably have a viscosity of 5 to 30 Pa·s at 25 degrees C. As the adhesive, VYLON 50AS, ex TOYOBO Co., Ltd., may preferably be used. As the pressure-sensitive adhesive, SK Dyne 1309, ex Soken Chemical & Engineering Co., Ltd., may preferably be used.

The film comprises a base layer besides the adhesive layer. The base layer may be, for example, a film of a thermoplastic resin such as polyvinyl chloride, non-crystalline, low-crystalline or crystalline polyester, polyolefin including polypropylene and polyethylene, styrene resin including acrylonitrile-butadiene-styrene copolymer (ABS resin), styrene-ethylene-butadiene-styrene copolymer, acrylonitrile-styrene-acryl copolymer, acrylonitrile-ethylene-propylene-diene-styrene copolymer and their hydrogenated ones, polyamide, acrylic resin, polycarbonate and polyurethane, and a film of two or more of these thermoplastic resins. These films may be a non-drawn film, a uniaxiallydrawn film and a biaxially-drawn film. In view of applicability to vacuum forming and vacuum and pressure forming, non-drawn films of polyvinyl chloride, non-crystalline polyester and acrylic resin are particularly preferred. As the polyvinyl chloride film, S12109 Fc1174, ex Riken Technos Corp., may preferably be used. As the non-crystalline polyester film, FET101, ex Riken Technos Corp., may preferably be used. As the acrylic resin film, TECHNOLLOY S001G, ex Sumitomo Chemical Co., Ltd., may preferably be used.

The present molded article may be produced by covering the surface of the substrate with the film, preferably, in a vacuum forming or vacuum and pressure forming process.

Figure 1:
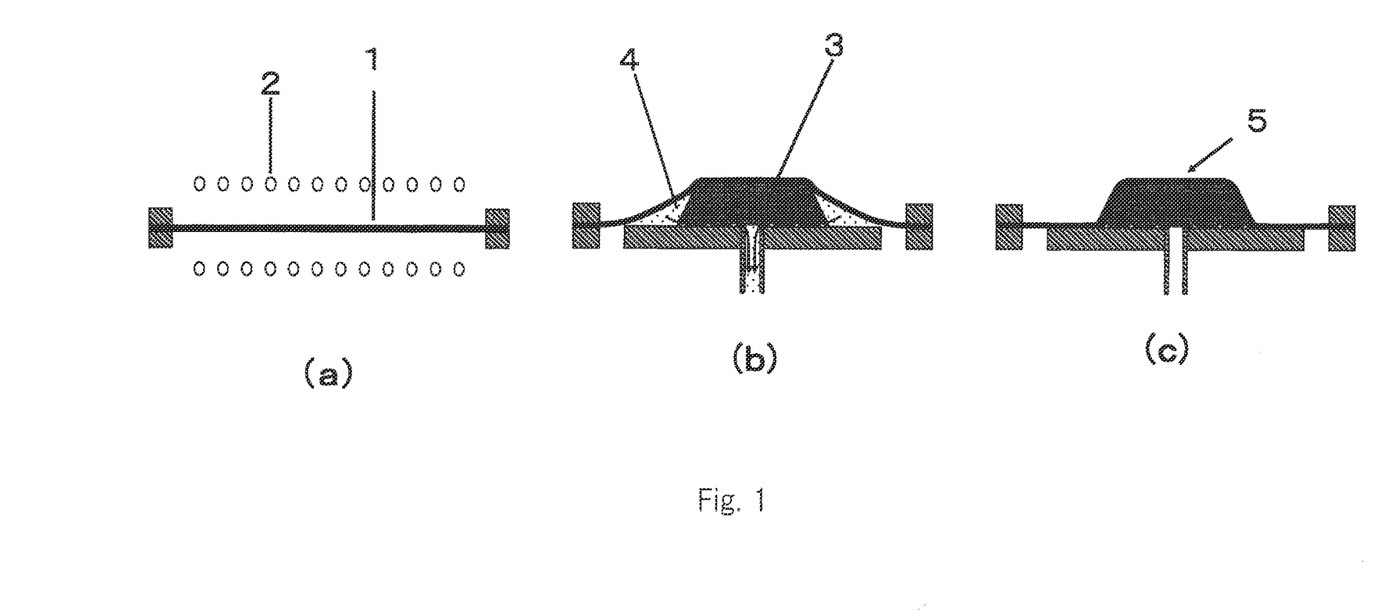
FIG. 1 is a schematic illustration on vacuum forming.

FIG. 1 shows an example of the vacuum forming process. In the vacuum forming process, film (1) is first heated to soften with, for instance, an infrared heater (2), as shown in FIG. 1 (a). Subsequently, the softened film (1) is removed from infrared heater (2) and promptly applied onto substrate (3) (FIG. 11(b)). Then, space (4) between film (1) and substrate (3) is decompressed so that film (1) is tightly adhered to substrate (3) to obtain molded article (5) covered with the film (FIG. 1(c)). The pressure in space (4) is preferably 10 KPa or less, more preferably 1 KPa or less. Such decompression in space (4) makes film (1) adhered tightly to substrate (3). As a result, no air remains between the film and the substrate. If the pressure in space (4) is higher than the aforesaid range, air tends to remain between the substrate and the film. The strength of the adhesion increases as the pressure in space (4) decreases. However, considering costs for obtaining less pressure, which increase exponentially, and mechanical strengths of the substrate and the film, the practical lower limit of the pressure in space (4) is approximately $10^{-5}$ KPa.

Figure 2:
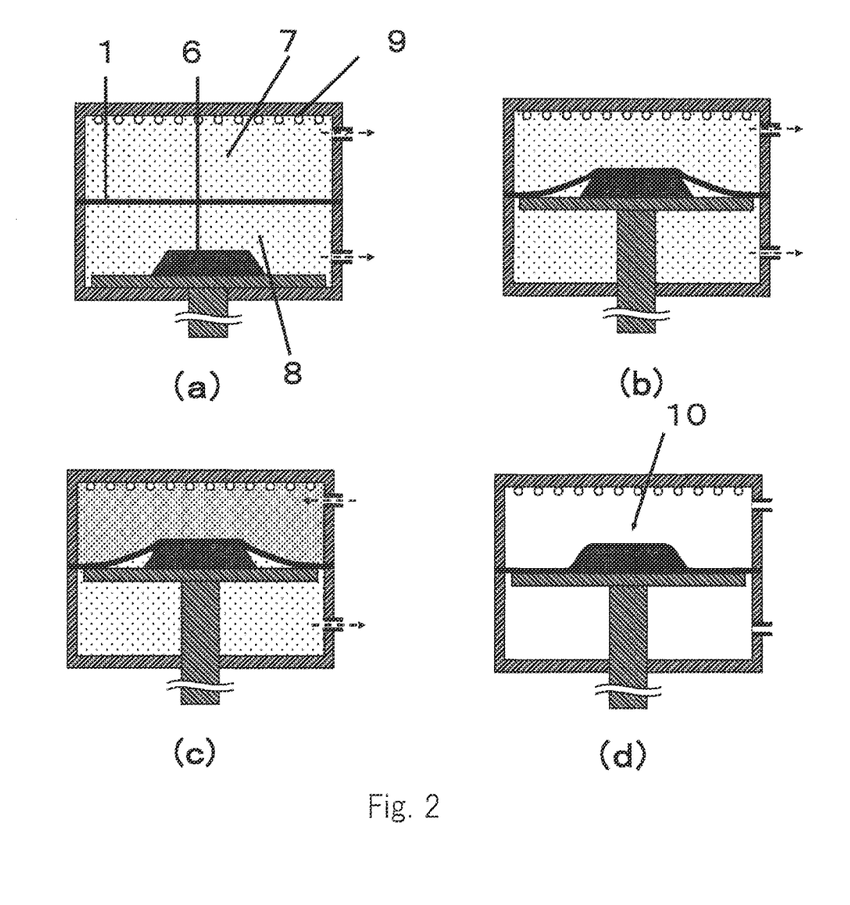
FIG. 2 is a schematic illustration on vacuum and pressure forming.

FIG. 2 shows an example of the vacuum and pressure forming process. In the vacuum and pressure forming process, film (1) and substrate (6) are first placed at the middle and at the bottom center of a molding room, respectively, the room is tightly closed and then upper chamber (7) and lower chamber (8) are decompressed to the same pressure (FIG. 2(a)). The pressures in upper chamber (7) and lower chamber (8) are preferably 10 KPa or less, more preferably 1 KPa or less, as in the vacuum forming process. After the chambers are enough decompressed, film (1) is heated to soften with heater (9) such as an infrared heater and then the well-softened film (1) is brought into contact with substrate (6) (FIG. 2(b)). Then, upper chamber (7) only is compressed to atmospheric pressure or higher, while keeping the decompression in lower chamber (8), so that film (1) is tightly adhered to substrate (6) (FIG. 2(c)) to obtain molded article (10) covered with the film (FIG. 2(d)). The pressure in upper chamber (7) in FIG. 2(c) is preferably 100 to 1000 KPa, more preferably 150 to 500 KPa. Such a pressure in upper chamber (7) makes film (1) adhered tightly to substrate (6). As a result, no air remains between the film and the substrate. If the pressure in upper chamber (7) is less than the aforesaid range or if the pressure in lower chamber (8) exceeds 10 KPa in FIG. 2(c), air tends to remain between the substrate and the film. If the pressure in upper chamber (7) exceeds the aforesaid range, the substrate or the film may be damaged during the vacuum and pressure forming. The strength of the adhesion increases as the pressure in lower chamber (8) decreases. However, considering costs for obtaining less pressure, which increase exponentially, and mechanical strengths of the substrate and the film, the practical lower limit of the pressure in lower chamber (8) is approximately $10^{-5}$ KPa.

The present molded article and the present production process may be applied to automobile exterior resin parts such as automobile instrument panels, window pillars and bumpers, housings of televisions, and housings of information-processing electronic equipments such as personal computers and smartphones, whose surfaces are to be covered with a film in order to protecting the surfaces or providing the surfaces with design.

EXAMPLES

In the following, the present invention will be illustrated by the Examples, but are not limited thereto.

Examples 1 to 32 and Comparative Examples 1 to 6

Production of a Substrate
(1) Production of a Resin Substrate (R)

Figure 3:
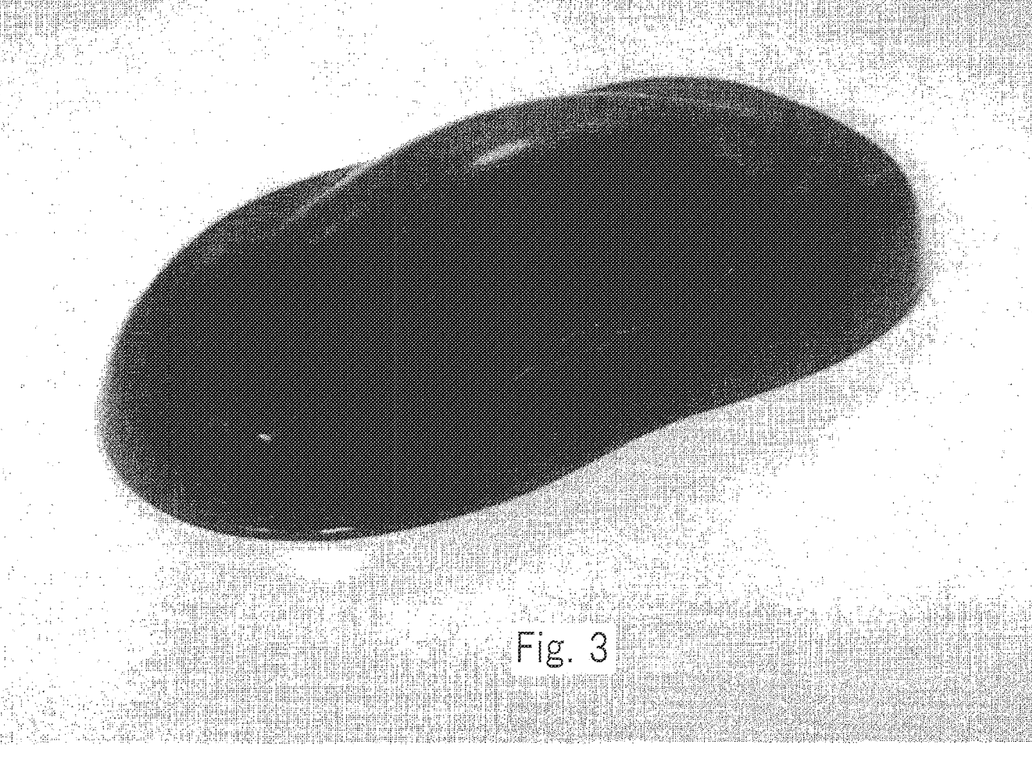
FIG. 3 is a photograph of an example of the present molded article.

ABS/PC alloy resin (EXCELLOY, trade name, ex Techno Polymer Co., Ltd.) was dried at a temperature of 100 degrees C. for 4 hours and then subjected to injection molding with a 100 ton injection molding machine, S-2000i 100A (ex Mitsubishi Heavy Industries Plastic Technology Co., Ltd.), at a cylinder temperature of 260 degrees C., a mold temperature of 70 degrees C., an injection rate of 250 mm/sec. and a holding pressure of 50 MPa to obtain a thermoplastic resin substrate having the shape as shown in FIG. 3. FIG. 3 is a photograph of the molded article of Example 1. On the surface of this substrate blasted was glass beads J-200 having a median diameter of 75 to 45 μm using a blasting machine, Myblast MY-30D (trade name, ex Sintokogio, Ltd.), in conditions of an air pressure of 0.3 MPa and an angle of 30 to 60 degrees. The time for the blasting was adjusted appropriately in the range of 1 to 20 seconds so that the desired surface roughness of the substrate was attained. After the blasting, the substrate was thoroughly washed with water and dried to obtain resin substrate (R) having the desired surface roughness (A).

(2) Production of a Metal Substrate (M)

An aluminum plate (A5052, trade name, thickness: 2 mm, ex Nippon Light Metal Company, Ltd.) was drawn using a pressing machine (OBS80S, trade name, ex Komatsu Industries Corp.) to obtain a metal substrate having a similar shape to that of the substrate (R). Glass beads were blasted to the surface of this substrate in the same manner as in (1) above to obtain a metal substrate (M) having the desired surface roughness (A).

Measurement of a Surface Roughness

Surface roughness (A) (maximum height mean (Rtm)) of each of the resin substrate and the metal substrate obtained above was measured using a roughness measuring instrument (HANDYSURF E-40A, ex Tokyo Seimitsu Co., Ltd.). Surface roughness (B) of a film mentioned below was measured similarly.

Production of a Film
(1) Production of Film ($α_0$) Comprising an Acrylic Pressure-sensitive Adhesive Layer An acrylic pressure-sensitive adhesive (acrylic acid and acrylate, SK Dyne 1309, trade name, ex Soken Chemical & Engineering Co., Ltd.) and a curing agent (L-45, tolylene diisocyanate, ex Soken Chemical & Engineering Co., Ltd.) were mixed with toluene and ethyl acetate as solvents in a weight ratio of 1000:6:100:100, and stirred well at room temperature for two minutes. This mixture was applied to a release film (Cerapeel WZ, trade name, thickness: 38 μm, ex Toray Advanced Film Co., Ltd.) and dried at 100 degrees C. for two minutes to obtain a pressure-sensitive adhesive layer having a thickness of 30 μm. Onto this pressure-sensitive adhesive layer layered was a film of cyclohexanedimethanol-copolymerized polyethylene terephthalate (PETG rein film, SET329 FZ26401, trade name, thickness: 100 μm, ex Riken Technos Corp.) as a base layer to obtain a film ($\alpha_0$) comprising the acrylic pressure-sensitive adhesive layer. The pressure-sensitive adhesive had a glass transition temperature of −25 degrees C. and a viscosity of 10 Pa·s at 25 degrees C. The surface of the pressure-sensitive adhesive layer, which surface was in contact with the release film, had a surface roughness of 2 μm.

(2) Production of Films (α) Comprising an Acrylic Pressure-sensitive Adhesive Layer Having Various Surface Roughnesses The same procedures as in the production of film ($\alpha_0$) described in (1) above were repeated, except that EMBLET S100 (ex UNITIKA Ltd.) whose surface was processed as described below was used as the release film to obtain films (α) comprising an acrylic pressure-sensitive adhesive layer whose surface which was in contact with the release film had various surface roughnesses. The release film was EMBLET S100 whose surface was processed by blasting glass beads J-200 having a median diameter of 75 to 45 μm using a blasting machine, Myblast MY-30D (trade name, ex Sintokogio, Ltd.), in conditions of an air pressure of 0.3 MPa and an angle of 30 to 60 degrees, washed with water, dried and then treated with silicone. The time for the blasting was adjusted appropriately in the range of 1 to 20 seconds so that the surface of the release film which surface was in contact with the pressure-sensitive adhesive layer had the desired surface roughness (B).

(3) Production of a Film (β) Comprising a Polyester Adhesive Layer

The same procedures as in the production of film (α) described in (2) above were repeated, except that the acrylic pressure-sensitive adhesive layer was replaced with the following polyester adhesive layer. The polyester adhesive layer was obtained as follows. Acid components consisting of terephthalic acid, isophthalic acid and adipic acid in a molar ratio of 30:30:40 were mixed with glycol components consisting of 1,4-butanediol and 1,6-hexanediol in a molar ratio of 25:75, and heated in the presence of a catalyst, tetrabutyl titanate, to prepare a thermoplastic saturated copolymeric polyester resin. The thermoplastic saturated copolymeric polyester resin thus obtained was dissolved in a solvent, methyl ethyl ketone, to obtain a solution having a solid content of 30% by mass. To this solution added were 2 equivalents of polyisocyanate (CORONATE HX, hexamethylene diisocyanate, solid content: 100%, ex Nippon Polyurethane Industry Co., Ltd.), and stirred well at room temperature for 2 minutes. This mixture was applied to a release film to obtain an adhesive layer having a thickness of 30 μm. The release film was the same as in (2) above, except that the time for the blasting of the glass beads was adjusted so that the surface of the adhesive layer, which surface was to be in contact with the release film, had a surface roughness (B) of 13 μm. The adhesive had a glass transition temperature of 23 degrees C. and a viscosity of 25 Pa·s at 25 degrees C.

The substrate and the film obtained as described above were subjected to the vacuum forming as shown in FIG. 1 or the vacuum and pressure forming as shown in FIG. 2 to obtain a molded article comprising the substrate whose surface was covered with the film. The molded article thus obtained was allowed to stand at room temperature for 24 hours or more and then subjected to the following tests. The results are as shown in Table 1, together with the kinds of the substrates and films, and the forming methods used. When the vacuum and pressure forming was used, pressure in lower chamber (8) and pressure in upper chamber (7) in Table 1 were those in FIG. 2 (c).

Tests (1) Appearance

Appearance of the surface of the film of the molded article was visually rated on the following criteria.

G: Neither blister nor concave-convex pattern was observed.

M: Very slight blister or concave-convex pattern was observed.

B: Blister or concave-convex pattern was observed which was as large as to catch a finger when touched the surface.

(2) Adhesion

The surface of the film of the molded article was cut square in 100×25 mm. The film was peeled off at one end of the square. This end was held by a chuck of a tensile testing machine, Tensilon RTG-1310, ex A&D Company, Ltd., and an end of the molded article was held by the other chuck of the testing machine to measure a peeling strength at a rate of pulling of 300 mm/min.

G: The peeling strength was 30N/25 mm or more.

M: The peeling strength was 20N/25 mm to less than 30N/25 mm.

B: The peeling strength was less than 20N/25 mm.

(3) Heat Resistance (Appearance after Exposure to a High Temperature)

The molded article was kept in a Geer oven at 100 degrees C for 168 hours and then taken out. After allowed to stand at room temperature for an hour, the appearance of the molded article was visually rated for heat resistance, based on the following criteria:

G: Neither blister nor concave-convex pattern was observed.

M: Very slight blister or concave-convex pattern was observed.

B: Blister or concave-convex pattern was observed, which was as large as to catch a finger when touched the molded article.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Comp. Ex. 1 | Comp. Ex. 2 |
|---|---|---|---|---|---|---|---|---|---|---|---|---|---|---|
| Substrate | R | R | R | R | R | R | M | M | M | M | M | M | R | R |
| Surface roughness(A) of the substrate, μm | 3 | 8 | 13 | 13 | 16 | 20 | 3 | 8 | 13 | 13 | 16 | 20 | 1 | 30 |
| Film | (α) | (α) | (α) | (β) | (α) | (α) | (α) | (α) | (α) | (β) | (α) | (α) | (α) | (α) |
| Surface roughness(B) of the film, μm | 13 | 13 | 13 | 13 | 13 | 13 | 13 | 13 | 13 | 13 | 13 | 13 | 13 | 13 |

TABLE 1-continued

| | | | | | | | | | | | | | | |
|---|---|---|---|---|---|---|---|---|---|---|---|---|---|---|
| Forming method | P* | P | P | P | P | P | P | P | P | P | P | P | P | P |
| Pressure in lower chamber (8), KPa | 0.001 | 0.001 | 0.001 | 0.001 | 0.001 | 0.001 | 0.001 | 0.001 | 0.001 | 0.001 | 0.001 | 0.001 | 0.001 | 0.001 |
| Pressure in upper chamber (7), KPa | 200 | 200 | 200 | 200 | 200 | 200 | 200 | 200 | 200 | 200 | 200 | 200 | 200 | 200 |
| (1) Appearance | G | G | G | G | G | G | G | G | G | G | G | G | B | B |
| (2) Adhesion | G | G | G | G | G | G | G | G | G | G | G | G | G | B |
| (3) Heat resistance | M | G | G | G | G | M | M | G | G | G | G | M | B | B |

| | Comp. Ex. 3 | Comp. Ex. 4 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|---|
| Substrate | M | M | R | R | R | R | R | R | R | R | R | R | R | R |
| Surface roughness (A) of the substrate, μm | 1 | 30 | 13 | 13 | 13 | 13 | 13 | 13 | 13 | 13 | 13 | 13 | 13 | 13 |
| Film | (α) | (α) | (α₀) | (α) | (α) | (α) | (α) | (α) | (α) | (α) | (α) | (α) | (α) | (α) |
| Surface roughness(B) of the film, μm | 13 | 13 | 2 | 3 | 8 | 16 | 20 | 30 | 13 | 13 | 13 | 13 | 13 | 13 |
| Forming method | P | P | P* | P | P | P | P | P | P | P | P | P | P | P |
| Pressure in lower chamber(8), KPa | 0.001 | 0.001 | 0.001 | 0.001 | 0.001 | 0.001 | 0.001 | 0.001 | 1.2 | 100 | 0.001 | 0.001 | 0.001 | 0.001 |
| Pressure in upper chamber (7), KPa | 200 | 200 | 200 | 200 | 200 | 200 | 200 | 200 | 200 | 200 | 750 | 140 | 70 | 1300 |
| (1) Appearance | B | B | M | G | G | G | G | M | M | M | G | G | M | G |
| (2) Adhesion | G | B | G | G | G | G | G | G | G | M | G | G | G | G |
| (3) Heat resistance | B | B | M | M | G | G | M | M | M | M | G | M | M | G |

| | Ex. 25 | Ex. 26 | Ex. 27 | Ex. 28 | Ex. 29 | Ex. 30 | Ex. 31 | Ex. 32 | Comp. Ex. 5 | Comp. Ex. 6 |
|---|---|---|---|---|---|---|---|---|---|---|
| Substrate | R | R | R | R | R | R | R | R | R | R |
| Surface roughness(A) of the substrate, μm | 3 | 8 | 13 | 13 | 16 | 20 | 13 | 13 | 1 | 30 |
| Film | (α) | (α) | (α) | (β) | (α) | (α) | (α) | (α) | (α) | (α) |
| Surface roughness(B) of the film, μm | 13 | 13 | 13 | 13 | 13 | 13 | 13 | 13 | 13 | 13 |
| Forming method | V* | V | V | V | V | V | V | V | V | V |
| Pressure in space(4), KPa | 0.001 | 0.001 | 0.001 | 0.001 | 0.001 | 0.001 | 1.2 | 100 | 0.001 | 0.001 |
| (1) Appearance | G | G | G | G | G | G | M | M | B | B |
| (2) Adhesion | G | G | G | G | G | G | G | M | G | B |
| (3) Heat resistance | M | G | G | G | G | M | M | M | B | B |

P: Vacuum and pressure forming
V: Vacuum forming

As seen in Table 1, the present molded articles were superior in appearance, adhesiveness and heat resistance. On the other hand, the molded articles of Comparative Examples 1, 3 and 5 had the surface roughness (A) below the present lower limit and were inferior in appearance and heat resistance. The molded articles of Comparative Examples 2, 4 and 6 had the surface roughness (A) above the present upper limit and were inferior in appearance, adhesiveness and heat resistance. In Example 24, the pressure in upper chamber (7) in the vacuum and pressure forming was as high as 1300 KPa and, therefore, the substrate of the resulting molded article was deformed.

EXPLANATION OF THE SYMBOLS IN THE DRAWINGS

1: Film
2: Heater
3: Substrate
4: Space between a film and a substrate
5: Molded article
6: Substrate
7: Upper chamber
8: Lower chamber
9: Heater
10: Molded article

The invention claimed is:

1. A method for producing a molded article comprising a substrate whose outer surface is partially or wholly covered with a film, wherein the film has an adhesive layer and the adhesive layer is in contact with the outer surface of the substrate and the outer surface of the substrate has a surface roughness (A) of 3 to 20 µm, comprising a step of partially or wholly coveting the outer surface of the substrate with the film, wherein the adhesive layer on the film has a surface to be brought into contact with the substrate, the surface of the adhesive layer to be brought into contact with the substrate having a surface roughness (B) of 3 to 20 µm before the covering, wherein each of the surface roughness (A) and the surface roughness (B) is a mean maximum height (Rtm) obtained by extracting any part with an evaluation length L from a roughness profile, dividing the length L into five sections having equal lengths, measuring a maximum height from a bottom to a top in the roughness profile in each of the five sections and averaging the maximum heights of the five sections.

2. A method for producing a molded article according to claim 1, wherein the covering is carried out by vacuum forming or vacuum and pressure forming.

3. A method for preparing a film-covered molded article, comprising:
   providing a substrate having an outer surface with a surface roughness of from 3 to 20 µm;
   providing a thermoplastic resin film comprising an adhesive layer having an outer surface with a surface roughness of from 3 to 20 µm; and
   partially or wholly covering the outer surface of the substrate with the film so that the outer surface of the film adhesive layer contacts the outer surface of the substrate;
   wherein each surface roughness is a mean maximum height (Rtm) obtained by extracting any part with an evaluation length L from a roughness profile, dividing the length L into five sections having equal lengths, measuring a maximum height from a bottom to a top in the roughness profile in each of the five sections and averaging the maximum heights of the five sections.

4. The method of claim 3, wherein deaeration occurs between the substrate outer surface and the adhesive layer outer surface.

5. The method of claim 3, wherein the thermoplastic resin is a polyvinyl chloride, non-crystalline polyester, or acrylic resin.

6. A method for producing a molded article comprising a substrate whose outer surface is partially or wholly covered with a film, wherein the film has an adhesive layer, the adhesive layer is in contact with the outer surface of the substrate and the outer surface of the substrate has a surface roughness (A) of 3 to 20 µm, comprising a step of partially or wholly covering the surface of the substrate with the film, wherein the covering is carried out by vacuum forming or vacuum and pressure forming, wherein the surface roughness (A) is a mean maximum height (Rtm) obtained by extracting any part with an evaluation length L from a roughness profile, dividing the length L into five sections having equal lengths, measuring a maximum height from a bottom to a top in the roughness profile in each of the five sections and averaging the maximum heights of the five sections.

7. The method of claim 1, wherein the surface of the adhesive layer to be brought into contact with the substrate is roughened to have a surface roughness (B) of 3 to 20 µm.

* * * * *